Oct. 10, 1939.  L. SMITH  2,175,576
ADJUSTABLE MOUNTING DEVICE
Filed Aug. 6, 1936
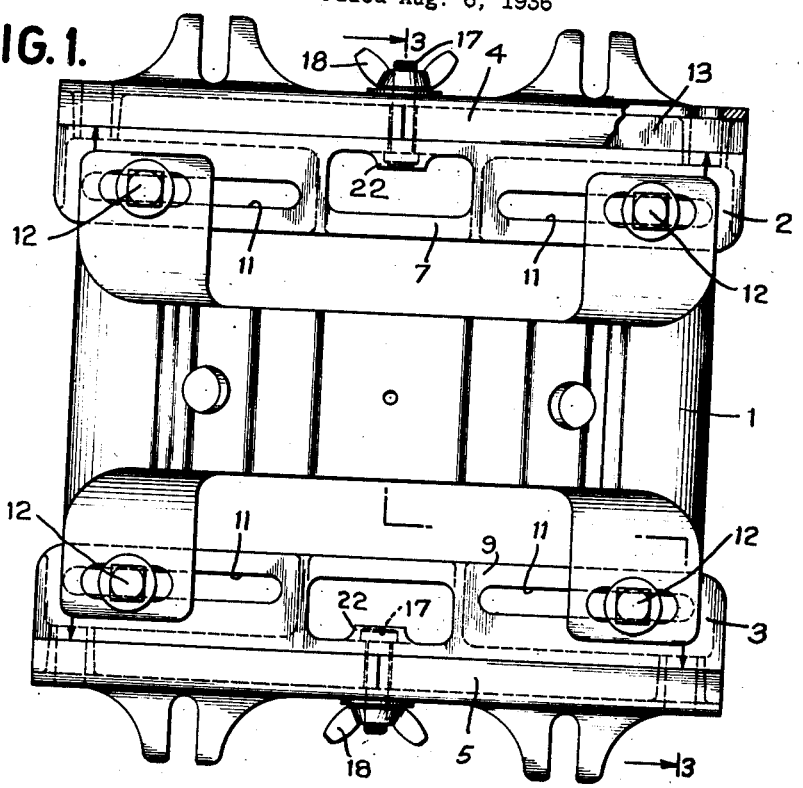
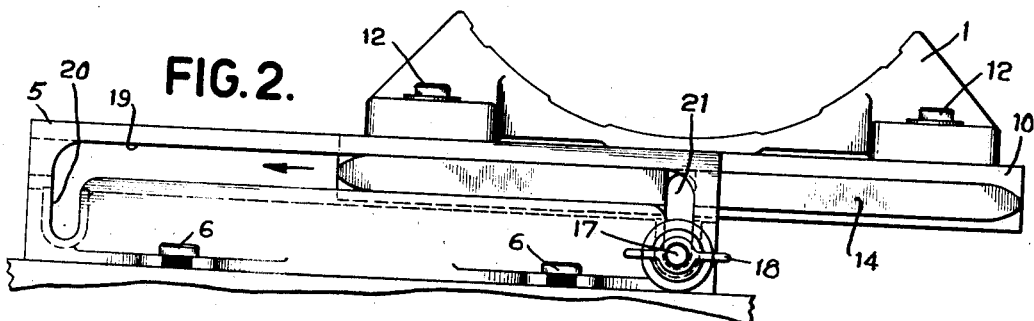
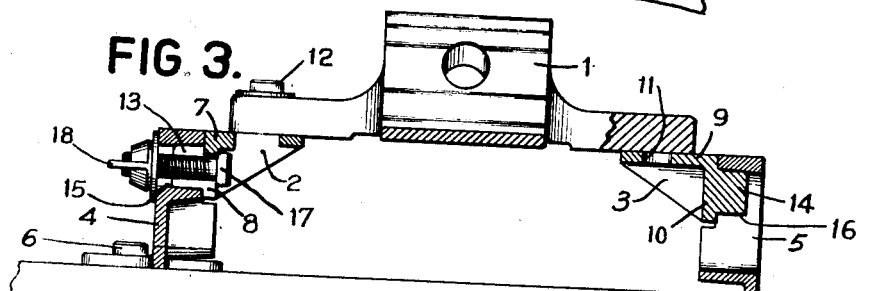
INVENTOR
Lindsley Smith.

Patented Oct. 10, 1939

2,175,576

UNITED STATES PATENT OFFICE 2,175,576

ADJUSTABLE MOUNTING DEVICE

Lindsley Smith, Southport, Conn.

Application August 6, 1936, Serial No. 94,515

3 Claims. (Cl. 248—23)

This invention relates to adjustable mounting devices and more particularly to sub-bases for supporting a prime mover such as a motor or engine, and embodies a novel and improved structure whereby the motor or other object supported is capable of adjustment whereby, for example, the belt connected thereto can be tightened or adjusted.

One of the objects of the present invention is to provide a mounting means which is simple and inexpensive in construction and convenient in operation to adjust and maintain the position of the objects supported.

Another object of the invention is the provision of means whereby the supported object can be easily removed from one device and transferred to another with a minimum of either preliminary or subsequent operations.

Various other objects and advantages of the invention will be obvious from the following particular description of one form of mechanism embodying the invention or from an inspection of the accompanying drawing; and the invention also constitutes certain new and useful features of construction and combination of parts hereinafter set forth and claimed.

In the drawing:

Fig. 1 is a plan view of the base mounting device.

Fig. 2 is a side view showing the movable base member partially extended.

Fig. 3 is a sectional view taken along the line 3—3 of Fig. 1.

With reference to the drawing, a suitable motor base 1 is shown secured to a mounting base or platform comprising parallel movable members 2 and 3 arranged to cooperate with parallel guide members or rails 4 and 5 which may be attached to any suitable support utilizing suitable means such as bolts 6 for fastening the said guide members in parallel relation to one another and in parallel relation to the desired driven member (not shown). The movable base supporting members 2 and 3 are of angular construction having right angled arm members or extensions 7—8 and 9—10 respectively. Any number of suitably spaced or arranged apertures 11 may be provided in the arms 7 and 9 of the movable base members so that various prime movers having different spaced apertures for receiving mounting studs 12 may be secured to the said members. Outwardly extending flanges 13 and 14 are provided on the outer sides of the arms 8 and 10 respectively, the flanges being adapted to be supported slidably in suitable channels 15 and 16 formed in the guide rails 4 and 5 respectively.

It is obvious from the description thus far that the parallel base members 2 and 3 may be slidably moved to any extent in the associated channels formed in the guide rails. It is evident that said base members may be slid to any position desired or may be removed from or inserted in the said guide rails at will.

In order to secure the slidable base members 2 and 3 in any desired position along the longitudinal axis of the guide rails clamping members such as the bolts and winged nuts 18 are provided. Elongated inverted U-type slots 19 are provided in the guide rails 4 and 5 as shown in Fig. 2. The extensions 20 of the slots 19 are adapted to receive the clamping bolts so that the bolts are disposed below the level of the channel section of the guide rails. Due to the arrangement described, it is possible for the slidable members 2 and 3 to be inserted in or withdrawn from the associated guide rails 4 and 5 without any interference from the clamping members or without removing the clamping members from the device.

To positively secure the movable members 2 and 3 when inserted and positioned in the guide rails, slots 21 are disposed in the arms 8 and 10 of the members 2 and 3 and extending through the extended flanges 13 and 14. To position the clamping members so as to be effective upon operation thereof for securing the movable base members, the said base members are inserted in the guide rails and positioned so that the slots 21 coincide with the extensions 20 of the inverted U-type slots. In the described position, the clamping members 17 and 18 can be raised to be inserted in the slots 21. Upon sliding the base members in the direction of the arrow indicated in the Fig. 2 with the clamping members in raised position, it is seen that the clamping members are maintained in a position along the longitudinal sections of the slots 19; that is, the clamping members are maintained in a position in the guide rails so that upon operation thereof they are effective to secure the movable base members in the desired position. Suitable extensions 22 are provided in the arms 7 and 9 of the base members to engage the heads of bolts 17 so as to prevent them from turning when the winged nuts 18 are turned to secure the base members in position.

It is understood that to remove or withdraw the motor base and base members from the guide rails, the only operation necessary is to loosen the clamping members. Upon withdrawal of the base members, the clamping members drop in the slot extensions 20 when the slots 21 and slot extensions 20 coincide, thereby permitting complete withdrawal of the base members.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. A device of the type described comprising a pair of guide members, each member having a channel longitudinally formed thereon, a mounting base having side flanges, which flanges are inserted in the channels in the guide members so that the mounting base is supported by said members and slidably disposed thereon, individual slots longitudinally formed in each of the guide members, clamping means disposed in said slots and cooperating with the guide members and inserted base for securing the members and base in a fixed position along the guide members, means provided in the guide members whereby the clamping means may be removed from the longitudinally formed slots yet retained in the members, and means provided whereby the mounting base may be withdrawn and removed from said guide members when the clamping means are removed from the said slots.

2. A device of the type described comprising a pair of guide members, each member having a channel longitudinally formed thereon, a mounting base having side flanges, which flanges are inserted in the channels in the guide members so that the mounting base is supported by said members and slidably disposed thereon, individual slots longitudinally formed in each of the guide members, clamping means disposed in said slots and cooperating with the guide members and inserted base for securing the members and base in a fixed position along the guide members, means provided in the guide members at each extremity whereby the clamping means may be removed from the longitudinally formed slots yet retained in the members, and means provided in the base whereby the base may be withdrawn from either extremities of the guide members and removed therefrom when the clamping means are removed from the said slots.

3. A device of the type described comprising guide members, a mounting base slidably supported by said guide members, said base provided with slots, an elongated inverted U type slot formed in each guide member, and clamping means extending through the slots in the base and guide members to secure them in any fixed position, said slots so arranged to permit the clamping means to be disposed in the inverted U type slots in the guide members thereby permitting complete removal of the base from the guide members without removal of the clamping means.

LINDSLEY SMITH.